US007667349B2

(12) United States Patent  (10) Patent No.: US 7,667,349 B2
Nielsen  (45) Date of Patent: Feb. 23, 2010

(54) PROVIDING POWER TO A LOAD BY CONTROLLING A PLURALITY OF GENERATING DEVICES

(75) Inventor: Bradley Lynn Nielsen, Sammamish, WA (US)

(73) Assignee: Texas Instruments Incorporated, Dallas, TX (US)

( * ) Notice: Subject to any disclaimer, the term of this patent is extended or adjusted under 35 U.S.C. 154(b) by 369 days.

(21) Appl. No.: 11/437,395

(22) Filed: May 17, 2006

(65) Prior Publication Data

US 2006/0274469 A1 Dec. 7, 2006

Related U.S. Application Data

(60) Provisional application No. 60/687,671, filed on Jun. 6, 2005.

(51) Int. Cl.
H02J 1/10 (2006.01)
H02J 1/00 (2006.01)
G05F 3/08 (2006.01)

(52) U.S. Cl. ............... 307/53; 307/43; 307/44; 307/52; 307/84

(58) Field of Classification Search ............... None
See application file for complete search history.

(56) References Cited

U.S. PATENT DOCUMENTS

| | | | | |
|---|---|---|---|---|
| 3,984,799 A | * | 10/1976 | Fletcher | 363/21.08 |
| 4,490,780 A | * | 12/1984 | Nondahl | 363/87 |
| 4,620,272 A | * | 10/1986 | Fulton et al. | 363/53 |
| 4,896,242 A | * | 1/1990 | Neft | 361/87 |
| 5,302,857 A | * | 4/1994 | Charles et al. | 307/20 |
| 5,309,349 A | * | 5/1994 | Kwan | 363/98 |
| 5,687,049 A | * | 11/1997 | Mangtani | 361/18 |
| 6,144,194 A | * | 11/2000 | Varga | 323/285 |
| 6,414,470 B1 | * | 7/2002 | Liu | 323/272 |
| 6,674,274 B2 | * | 1/2004 | Hobrecht et al. | 323/285 |
| 6,696,882 B1 | * | 2/2004 | Markowski et al. | 327/531 |
| 6,825,642 B2 | * | 11/2004 | Brooks | 323/272 |
| 6,839,252 B2 | * | 1/2005 | Tai et al. | 363/65 |
| RE38,846 E | * | 10/2005 | Walters | 323/272 |
| 6,977,489 B2 | * | 12/2005 | Isham | 323/272 |
| 6,995,548 B2 | * | 2/2006 | Walters et al. | 323/272 |
| 7,005,835 B2 | * | 2/2006 | Brooks et al. | 323/282 |
| 7,046,533 B2 | * | 5/2006 | Takemura et al. | 363/65 |
| 7,071,662 B2 | * | 7/2006 | Hsu et al. | 323/272 |
| 7,084,613 B2 | * | 8/2006 | Harris et al. | 323/272 |

(Continued)

Primary Examiner—Stephen W Jackson
Assistant Examiner—Adi Amrany
(74) Attorney, Agent, or Firm—John J. Patti; Wade J. Brady, III; Frederick J. Telecky, Jr.

(57) ABSTRACT

An apparatus for controlling provision of power to a load by a plurality of generating devices in a plurality of phased signals during a first operating condition includes: (a) a sensing unit coupled with the load for presenting an indicator relating to load current; and (b) a control unit coupled with the sensing unit for receiving the indicator and coupled with the plurality of generating devices. The control unit presents a first control signal in response to the indicator indicating a second operating condition. The control unit presents a second control signal in response to the indicator indicating a third operating condition. The generating devices respond to the first control signal to substantially simultaneously provide the power to the load. The generating devices respond to the second control signal to substantially provide no power to the load.

7 Claims, 5 Drawing Sheets

U.S. PATENT DOCUMENTS 7,122,995 B2 * 10/2006 Hasegawa et al. ............ 323/272
7,138,789 B2 * 11/2006 Moussaoui et al. .......... 323/272
7,285,941 B2 * 10/2007 Cha ............................ 323/272
7,298,197 B2 * 11/2007 Duerbaum et al. .......... 327/416
2005/0225307 A1 * 10/2005 Sato ............................ 323/282

* cited by examiner

PROVIDING POWER TO A LOAD BY CONTROLLING A PLURALITY OF GENERATING DEVICES

CROSS-REFERENCE TO RELATED APPLICATIONS

This application claims benefit of prior filed copending Provisional Patent Application Ser. No. 60/687,671, filed Jun. 6, 2005.

BACKGROUND OF THE INVENTION

The present invention is directed to electrical power supply devices, and especially to electrical power supply devices generating power using a plurality of generating units operating in a plurality of phases.

One design parameter involved in designing a power supply apparatus is the amount of capacitance one desires or needs at the output of converters providing current to the load. Capacitance may occupy significant area in implementing circuitry, such as power supply circuitry. The amount of capacitance required is at least partially dependent upon the amount of ripple current presented by the power supply device to the load. One benefit of reducing output capacitance is that the power supply apparatus may be configured using less board space and consequently be a smaller portion of a product in which it is employed. In today's marketplace with its emphasis on smaller more compact products, such a reduction in size is beneficial.

Multiphase DC-DC power supply apparatuses, especially multiphase power supply apparatuses embodied in multiphase converter apparatuses, have evolved to deliver more current to a load that is achievable using a single phase converter apparatus. Multiphase DC-DC apparatuses contribute other attributes as well such as, by way of example and not by way of limitation, increasing frequency of output ripple current from the power supply apparatus. Such reducing of output ripple current may permit some reduction in size of output capacitance for the power supply apparatus.

However, at least some capacitance is usually necessary for a power supply apparatus because ripple currents produced by inductors in the apparatus generally remain and must be accommodated. Capacitance at the output of a power supply apparatus also permits holding output voltages in regulation between the time a step increase in the load occurs and the time the control loop of the power supply apparatus can respond to the step load increase.

There is a need for an apparatus and method for controlling provision of power to a load by a plurality of generating devices such as a multiphase power supply apparatus that can efficiently respond to a step increase in a load yet minimize capacitance required at the power supply output.

SUMMARY OF THE INVENTION

An apparatus for controlling provision of power to a load by a plurality of generating devices in a plurality of phased signals during a first operating condition includes: (a) a sensing unit coupled with the load for presenting an indicator relating to load current; and (b) a control unit coupled with the sensing unit for receiving the indicator and coupled with the plurality of generating devices. The control unit presents a first control signal in response to the indicator indicating a second operating condition. The control unit presents a second control signal in response to the indicator indicating a third operating condition. The generating devices respond to the first control signal to substantially simultaneously provide the power to the load. The generating devices respond to the second control signal to substantially provide no power to the load.

A method for controlling provision of power to a load by a plurality of generating devices coupled with the load to cooperatively effect providing power to the load in a plurality of phased signals during a first operating condition includes the steps of: (a) In no particular order: (1) providing a sensing unit coupled with the load; and (2) providing a control unit coupled with the sensing unit and coupled with a plurality of selected generating devices of the plurality of generating devices. (b) Operating the sensing unit to present a current indicator relating to sensed current through the load. (c) Operating the control unit to receive the current indicator. (d) When the current indicator indicates a second operating condition, operating the control unit to present at least one first control signal. (e) When the current indicator indicates a third operating condition, operating the control unit to present at least one second control signal. (f) Operating first responsive generating devices of the selected generating devices to substantially simultaneously provide the power to the load in response to the first control signal. (g) Operating second responsive generating devices of the selected generating devices to substantially provide no power to the load in response to the second control signal.

It is, therefore, a feature of the present invention to provide an apparatus and method for controlling provision of power to a load by a plurality of generating devices such as a multiphase power supply apparatus that can efficiently respond to a step increase in a load yet minimize capacitance required at the power supply output.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
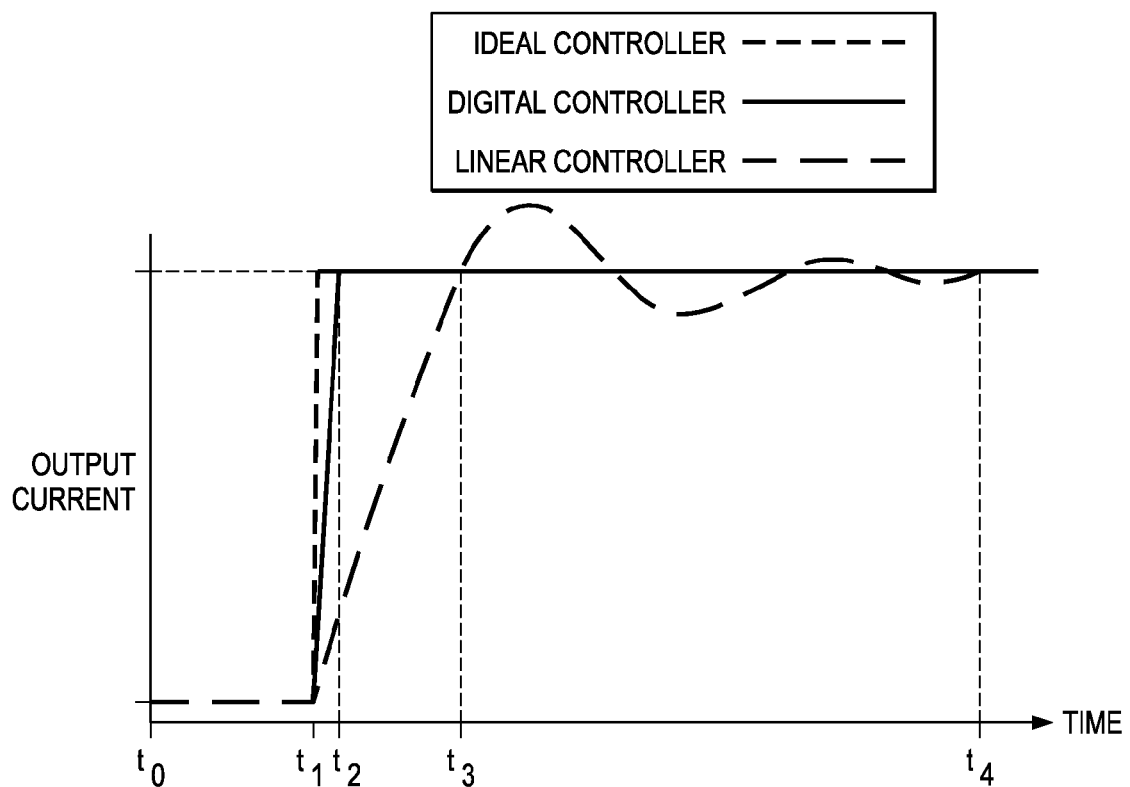
FIG. 1 is a graph of output current versus time in a power supply with an ideal controller, with a linear or conventional controller, and with a digital controller in accordance with a preferred embodiment of the present invention upon application of a step increase.

Refer now to the drawings wherein depicted elements are, for the sake of clarity, not necessarily shown to scale and wherein like or similar elements are designated by the same reference numeral through the several views.

Multi-phase power supply apparatuses operate pursuant to control by a controller device executing a control loop operation or algorithm. Prior art controller devices operated to balance current through inductors to present power supply output currents in a plurality of phases. The controller device also seeks to maintain balance among phases during transients, such as when a step increase occurs in the load. Prior art controller devices maintain a duty cycle of switches that effect coupling of respective converter devices with the load so that one converter device is providing current to the load at a time. On-time for each respective converter device is fixed to occur at a given time. Off-time for converters is extended to decrease current from the supply to the load. Off-time is decreases to increase current from the supply to the load. Using a prior art control technique sometimes referred to as current mode control (CMC) output voltage is monitored and compared against a reference voltage to ascertain an error voltage. The error voltage typically represents the difference between the output voltage and the reference voltage. The error voltage is used to derive a duty cycle for supply currents that is appropriate to keep the current per phase balanced among phases.

As mentioned earlier herein, capacitance is employed at the output of power supply apparatuses to hold output voltages in regulation during such transient conditions such as step changes in a load. A problem with prior art power supply apparatuses described above is that the control loop employed does not accommodate step changes in load with a sufficiently quick response time. Providing a quick response to load changes, such as step changes in load, can reduce a need for capacitance to hold output voltages in regulation during such transient conditions.

FIG. 1 is a graph of output current versus time in a power supply. The curves illustrate the variation in output current for an ideal controller, a linear or conventional controller, and a digital controller (which is described below).

Figure 2:
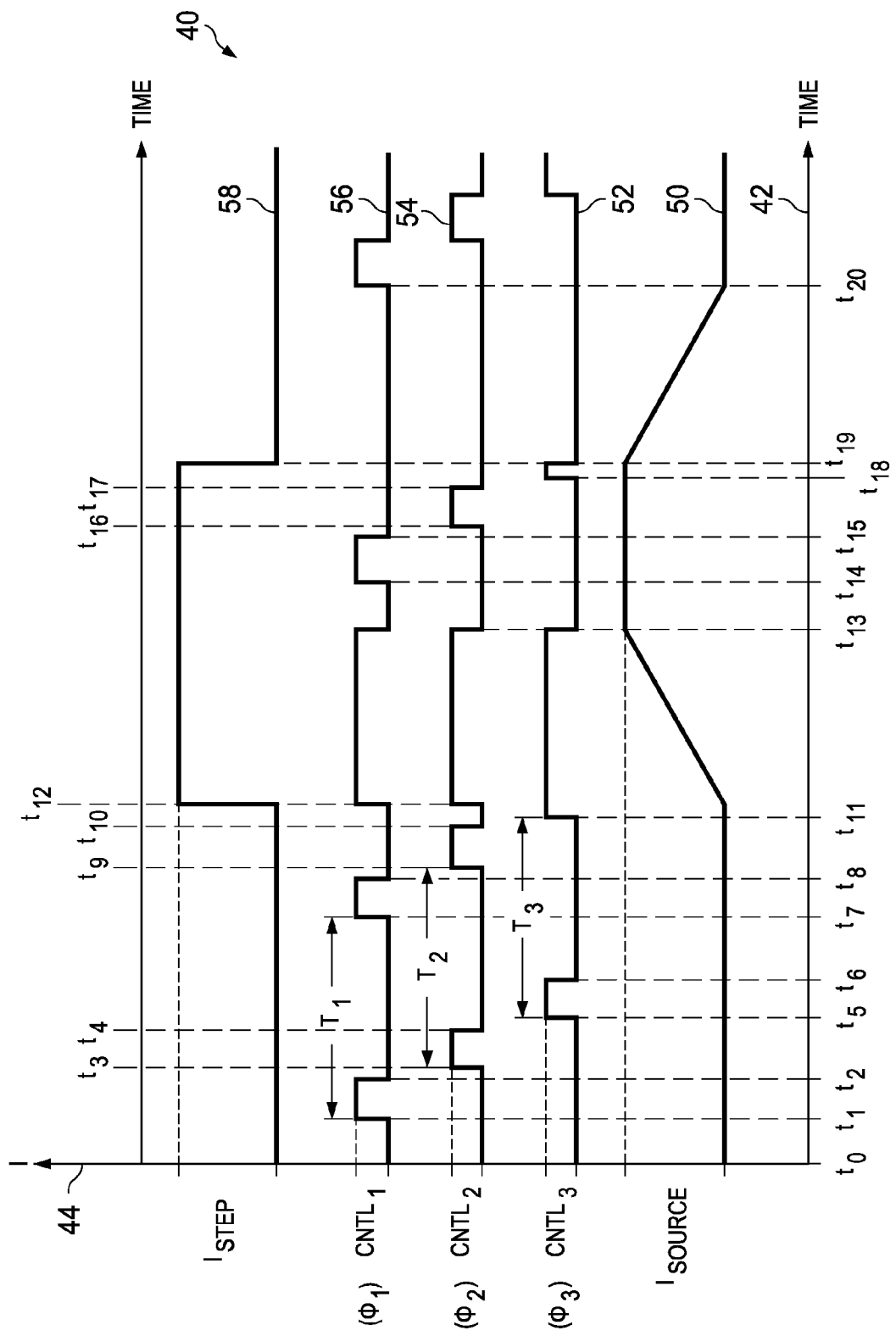
FIG. 2 is a timing diagram of selected parameters in a power supply device during operation of a preferred embodiment of the present invention.

FIG. 2 is a timing diagram for a digital controller in accordance with a preferred embodiment of the present invention. The timing diagram illustrates the relationship among a source current $I_{SOURCE}$ being provided to a load by a three phase DC-DC power supply, where $\Phi_1$, $\Phi_2$, and $\Phi_3$ represent the three different phases. As can be seen, each of phase $\Phi_1$, $\Phi_2$, and $\Phi_3$ are successively actuated between $t_0$ and $t_{11}$, with a predetermined period $T_1$, $T_2$, and $T_3$ (respectively) between actuation periods. Clearly, the step current $I_{STEP}$ is logic low, the three phases $\Phi_1$, $\Phi_2$, and $\Phi_3$ are not simultaneously actuated, but at t12, when the step current $I_{STEP}$ transitions to logic high, all three phases $\Phi_1$, $\Phi_2$, and $\Phi_3$ are not simultaneously actuated.

Employing multiple supply current phased signals substantially simultaneously to make the power supply more responsive to rapid or step-wise changes in load current (e.g., $I_{STEP}$) reduces variations in output current from the power supply (e.g., $I_{SOURCE}$), thereby reducing the need for capacitance at the output of the power supply. Less than all supply current phased signals may be employed simultaneously to effect the desired power supply response to changes in load current. It is preferred that all supply current phased signals be employed simultaneously to effect the desired power supply response to changes in load current.

Figure 3:
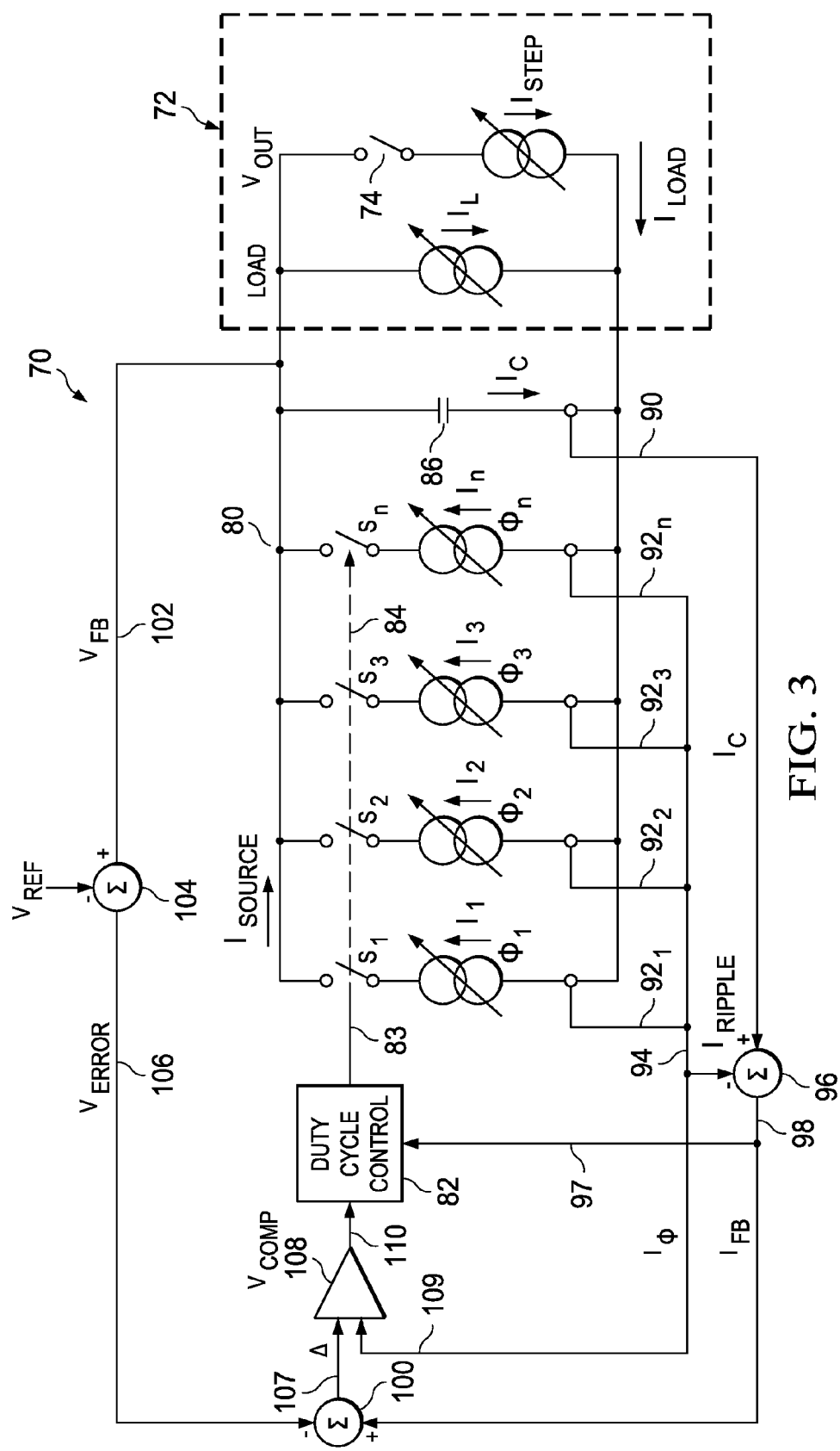
FIG. 3 is a schematic diagram of a preferred embodiment of the present invention.

FIG. 3 is a schematic diagram of a preferred embodiment of the present invention. In FIG. 3, a power supply 70 having an output node 80 coupled with a load 72. Load 72 is represented in FIG. 3 as carrying a load current $I_L$ and including a switch 74 which controls application of a step current $I_{STEP}$ to load 72. Power supply 70 includes a plurality of current sources or phases $\Phi_1$ (providing a first supply current $I_1$), $\Phi_2$ (providing a second supply current $I_2$), $\Phi_3$ (providing a third supply current $I_3$), $\Phi_n$ (providing a nth supply current $I_n$). The indicator "n" is employed to signify that there can be any number of current sources or phases in power supply 70. The inclusion of four phases $\Phi_1$, $\Phi_2$, $\Phi_3$, and $\Phi_n$ in FIG. 3 is illustrative only and does not constitute any limitation regarding the number of phases that may be included in the power supply 70.

Phases $\Phi_1$, $\Phi_2$, $\Phi_3$, and $\Phi_n$ are selectively activated in a phased manner substantially as described and/or shown in connection with FIG. 2. Each respective phase $\Phi_1$, $\Phi_2$, $\Phi_3$, and $\Phi_n$ is selectively coupled with output node 80 via a respective switch $S_1$, $S_2$, $S_3$, and $S_n$. Each respective switch $S_1$, $S_2$, $S_3$, and $S_n$ responds to actuation signals $CNTL_1$, $CNTL_2$, $CNTL_3$, and $CNTL_4$ from node 83 of duty cycle control unit 82. Actuation signals $CNTL_1$, $CNTL_2$, $CNTL_3$, and $CNTL_4$ may be provided individually to each respective switch $S_1$, $S_2$, $S_3$, and $S_n$, or a single signal may be employed as an control signal with embedded, coded or otherwise included coding or identification for distinguishing which switch or switches are to be closed or opened to control output current $I_{SOURCE}$ provided by power supply 70 at output node 80 for load 72.

A capacitor 86 is coupled in parallel with load 72. A current feedback node 90 is coupled to indicate current $I_C$ through capacitor 86. Current $I_C$ through capacitor 86 is an indication of total load current $I_{LOAD}$ through load 72. Total load current $I_{LOAD}$ through load 72 includes a load current $I_L$ and any step current $I_{STEP}$ that may pass when switch 74 is closed. Current feedback node 94 is coupled to respectively indicate currents through phases $\Phi_1$, $\Phi_2$, $\Phi_3$, and $\Phi_n$. Nodes 90 and 94 are coupled with a summing node 96 in a manner to effect subtraction of ripple current $I_{RIPPLE}$ present in total load current $I_{LOAD}$ to present a feedback current $I_{FB}$ at a feedback node 98. Feedback node 98 is coupled to provide feedback current $I_{FB}$ to duty cycle control unit 82 and to a summing node 100.

A feedback node 102 provides a feedback voltage $V_{FB}$ from load 72 to a summing node 104. A reference voltage $V_{REF}$ is also provided to summing node 104 in a manner to present an error voltage $V_{ERROR}$ at a feedback node 106. Error voltage $V_{ERROR}$ represents a difference between feedback voltage $V_{FB}$ and reference voltage $V_{REF}$. Feedback line 106 is coupled with summing node 100 in a manner to present a difference indicating signal $\Delta$ at a first input 107 to a comparator 108. A second input 109 to comparator 108 is coupled with node 94. Comparator 108 presents a comparator output signal $V_{COMP}$ at node 110. Comparator output signal $V_{COMP}$ is provided to duty cycle control unit 82 for use in generating control signals at node 83. Feedback current $I_{FB}$ is also provided to duty cycle control unit 82 via a node 97 for use in generating control signals at node 83.

Provision of an error voltage $V_{ERROR}$ representing difference between feedback voltage $V_{FB}$ and reference voltage $V_{REF}$ for use in comparing with a phased current indication signal $I_\Phi$ indicating phases $\Phi_1$, $\Phi_2$, $\Phi_3$, and $\Phi_n$ employs known techniques sometimes referred to as current mode control (CMC).

Using CMC techniques alone, duty cycle control unit 82 may use comparator output signal $V_{COMP}$ to maintain a duty cycle of switches $S_1$ through $S_n$ that effect coupling of respective phases $\Phi_1$, $\Phi_2$, $\Phi_3$, and $\Phi_n$ with load 72 so that one phases $\Phi_1$, $\Phi_2$, $\Phi_3$, or $\Phi_n$ is providing current to load 72 at a time. On-time for each respective phases $\Phi_1$, $\Phi_2$, $\Phi_3$, and $\Phi_n$ is fixed to occur at a given time. Off-time for phases $\Phi_1$, $\Phi_2$, $\Phi_3$, and $\Phi_n$ is extended to decrease current to load 72. Off-time is decreased to increase current to load 72. By way of example and not by way of limitation, phases $\Phi_1$, $\Phi_2$, $\Phi_3$, and $\Phi_n$ may be embodied in a converter device, such as a buck converter, boost converter, a flyback converter or a converter employing another technology or technique.

Using the configuration illustrated in FIG. 3, power supply 70 may monitor output current and monitor load current to determine when load 72 has significantly changed. When load 72 increases (e.g., at time $t_{12}$ of FIG. 2) duty cycle control unit 82 employs CMC control feedback techniques to monitor output current and uses an indication of load current to identify that power supply 70 is not fully supplying load 72. In FIG. 3, when output current $I_{SOURCE}$ is less than load current $I_{LOAD}$, duty cycle control unit 82 operates to turn on all phases $\Phi_1$, $\Phi_2$, $\Phi_3$, and $\Phi_n$ until the cumulative current provided at output node 80 substantially matches load current $I_{LOAD}$. Also, when output current $I_{SOURCE}$ is greater than load current $I_{LOAD}$, duty cycle control unit 82 operates to turn off all phased current sources $\Phi_1$, $\Phi_2$, $\Phi_3$, and $\Phi_n$ until the cumulative current provided at output node 80 substantially matches load current $I_{LOAD}$. The technique employed by power supply 70 effects more efficient current delivery to load 72, thereby reducing cost and permitting reduction of output capacitance. Less capacitance is required because ripple current is reduced (summing node 96). The turning on or off of all phases $\Phi_1$, $\Phi_2$, $\Phi_3$, and $\Phi_n$ effects transition of output current $I_{SOURCE}$ more quickly so that less time elapses between the time a step increase in load 72 occurs and the time duty cycle control unit 82 can respond to the step load increase.

By way of example and not by way of limitation, one may effect turning on fewer than all of phases $\Phi_1$, $\Phi_2$, $\Phi_3$, and $\Phi_n$ during ramping up, during ramping down or during both ramping up and ramping down. Different numbers of phases $\Phi_1$, $\Phi_2$, $\Phi_3$, and $\Phi_n$ may be turned on for ramping up than may be turned on for ramping down, if desired.

Other parameters may be employed to determine when phases $\Phi_1$, $\Phi_2$, $\Phi_3$, and $\Phi_n$ should be turned on or off such as, by way of example and not by way of limitation, rate of rise or fall of load current $I_{LOAD}$, relative rates of rise or fall of load current $I_{LOAD}$ and output current $I_{SOURCE}$, absolute value of difference between load current $I_{LOAD}$ and output current $I_{SOURCE}$, duration of rise or fall of load current $I_{LOAD}$, or other parameters indicating a difference between load current $I_{LOAD}$ and output current $I_{SOURCE}$. Power supply 70 avoids a relatively slow reaction, generally as described in connection with conventional or linear controller as shown in FIG. 1 and approximates the faster reaction generally described in connection with an ideal controller as shown in FIG. 1.

Figure 4:
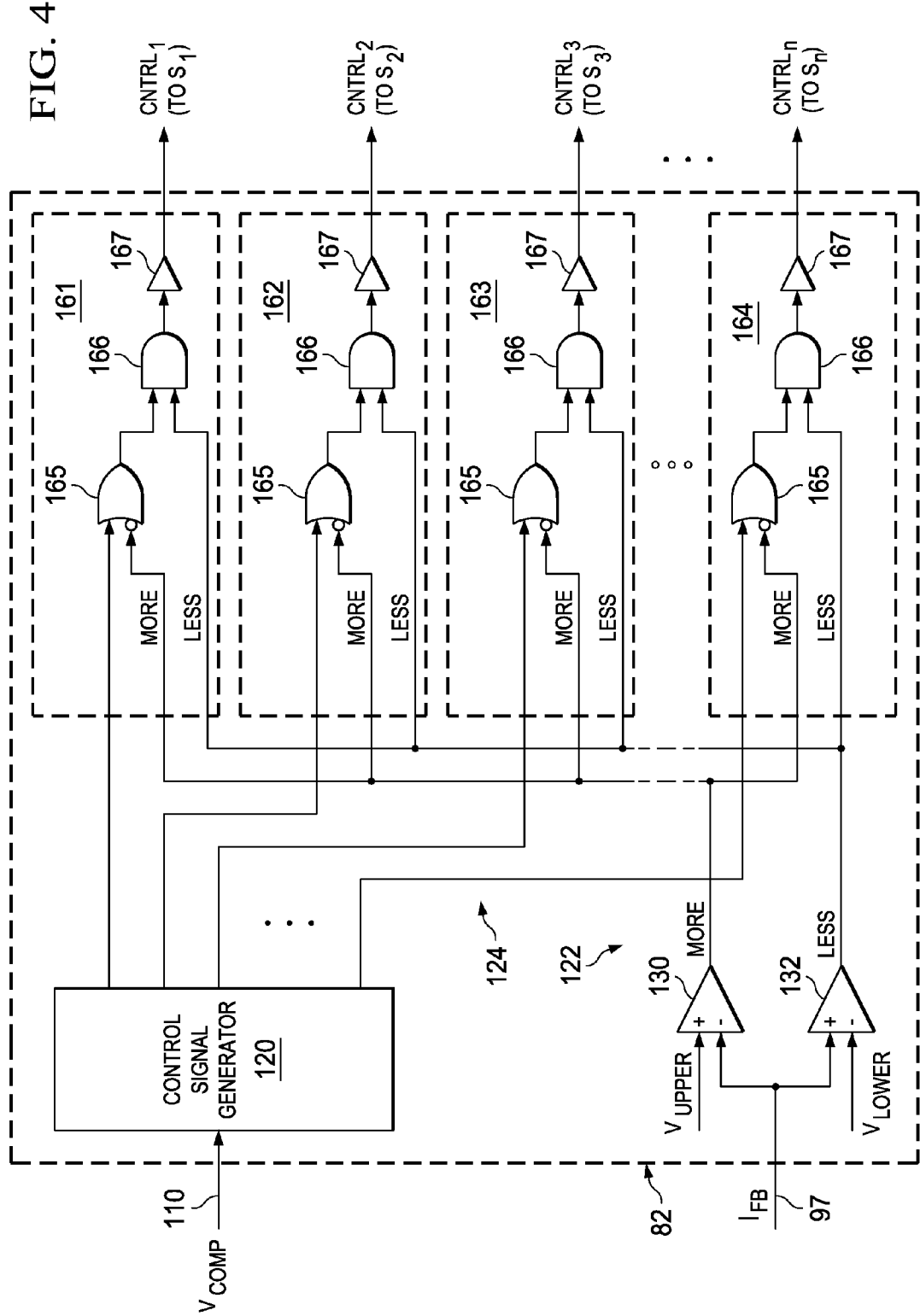
FIG. 4 is of the duty cycle control unit illustrated in FIG. 3.

FIG. 4 is a schematic diagram of details of the duty cycle control unit 82 as illustrated in FIG. 3. Duty cycle control unit 82 includes a control signal generator 120, a level setting unit 122 and a control logic unit 124. Control signal generator 120 receives a signal $V_{COMP}$ from a comparator 108 and generates control signals $CNTL_1$, $CNTL_2$, $CNTL_3$, and $CNTL_n$ (which are shown in FIG. 2. Control signals $CNTL_1$, $CNTL_2$, $CNTL_3$, and $CNTL_n$ control operation of switches $S_1$, $S_2$, $S_3$, and $S_n$.

Level setting unit 122 includes a first comparator 130 and a second comparator 132. First comparator 130 has a non-inverting input, an inverting input and an output MORE. An upper reference signal $V_{UPPER}$ is provided at non-inverting input. Node 97 is coupled with inverting input so that feedback current $I_{FB}$ is received at inverting input. When upper reference signal $V_{UPPER}$ is greater than feedback current $I_{FB}$, a "1" is presented at output MORE. When upper reference signal $V_{UPPER}$ is less than feedback current $I_{FB}$, a "0" is presented at output MORE.

Second comparator 132 has a non-inverting input, an inverting input, and an output LESS. A lower reference signal $V_{LOWER}$ is provided at inverting input. Node 97 is coupled with non-inverting input so that feedback current $I_{FB}$ is received at non-inverting input. When feedback current $I_{FB}$ is greater than lower reference signal $V_{LOWER}$, a "1" is presented at output LESS. When feedback current $I_{FB}$ is less than lower reference signal $V_{LOWER}$, a "0" is presented is presented at output locus LESS.

Control logic unit 124 includes logic units 161 through 164. Each logic unit 161 through 164 is associate with one of the switches $S_1$ through $S_n$ and provides the actuation signal $CNTL_1$ through $CNTL_n$. Each logic unit 161 through 164 is generally comprised of an OR gate 165, an AND gate 166, and an amplifier 167.

In operation, OR gate 165 receives a control signal from control signal generator 120 and an inverse of the output MORE of comparator 130. OR gate 165 presents a logical OR output signal, and AND gate 166 receives the logical OR output signal and is coupled with output LESS of comparator 132. AND gate 166 presents a logical AND output signal to amplifier 167, which presents a control signal $CNTL_1$, $CNTL_2$, $CNTL_3$, or $CNTL_n$ to its respective switch $S_1$, $S_2$, $S_3$, or $S_n$.

Inspecting FIG. 4, one may observe that so long as feedback current $I_{FB}$ is greater than $V_{LOWER}$ and less than $V_{UPPER}$ control signals from control signal generator 120 will be substantially unimpeded by control logic unit 124 to contribute substantially directly in amplitude and phase to actuation signals $CNTL_1$, $CNTL_2$, $CNTL_3$, $CNTL_n$. However, when feedback current $I_{FB}$ is less than $V_{LOWER}$, a "0" signal is presented at output LESS to AND gates 166. As a consequence, signals $CNTL_1$ through $CNTL_n$ are logic low or "0." This indicates that less current is required from power supply 70. This circumstance is present, by way of example and not by way of limitation, during time interval $t_{19}$-$t_{20}$ of FIG. 2. Additionally, when feedback current $I_{FB}$ is greater than $V_{UPPER}$ a "0" signal is presented on output MORE and inverted to appear as a "1" signal to OR gates 165, and a "1" signal is presented to AND gates 166. As a consequence, signals $CNTL_1$ through $CNTL_n$ are logic high or "1." This indicates that more current is required from power supply 70. This circumstance is present, by way of example and not by way of limitation, during time interval $t_{12}$-$t_{13}$ of FIG. 2.

Figure 5:
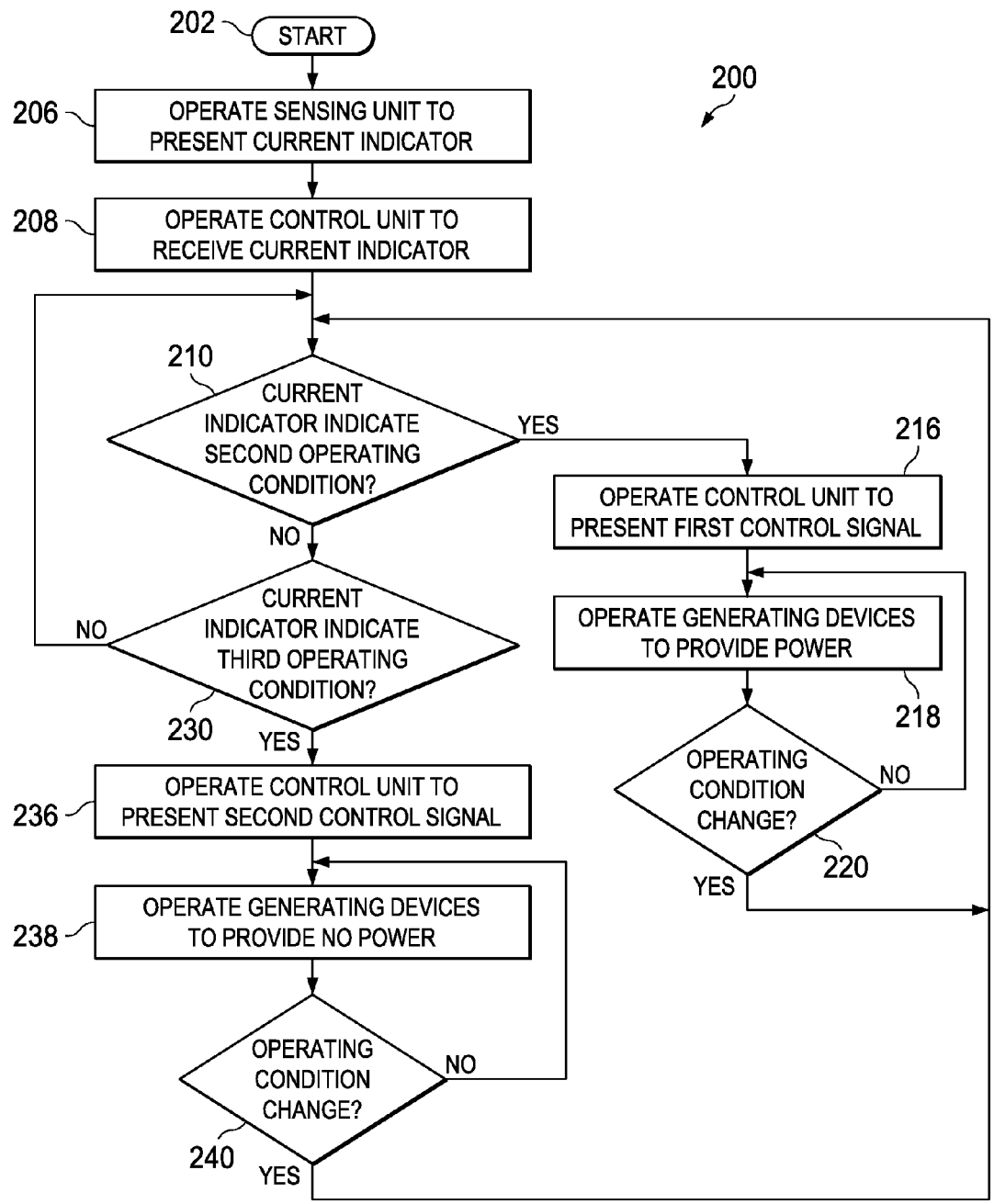
FIG. 5 is a flow chart illustrating the method of the present invention.

FIG. 5 is a flow chart illustrating the general operation of the power supply of FIG. 3. The plurality of generating devices are coupled with the load to cooperatively effect providing the power to the load in a plurality of substantially non-simultaneous phased signals during a first operating condition. Method 200 continues with operating the sensing unit to present a current indicator relating to sensed current through the load, as indicated by a block 206. Method 200 continues with operating the control unit to receive the current indicator, as indicated by a block 208.

Method 200 continues by posing a query whether the current indicator indicates a second operating condition, as indicated by a block 210. If the current indicator indicates a second operating condition, method 200 proceeds via YES response to effect operating the control unit to present at least one first control signal, as indicated by a block 216. Method 200 continues with operating the generating devices to provide power, as indicated by a block 218.

Method 200 continues by posing a query whether the operating condition has changed, as indicated by a block 220. If the operating condition has not changed, method 200 proceeds via NO response and continues operating the generating devices to provide power, as indicated by block 218. If the operating condition has changed, method 200 proceeds via YES response and returns to block 210 to continue.

If at the time of posing the query indicated by query block 210 the current indicator does not indicate a second operating condition, method 200 proceeds from query block 210 via NO response and another query is posed whether the current indicator indicates a third operating condition, as indicated by a block 230. If the current indicator indicates a third operating condition, method 200 proceeds via YES response to effect operating the control unit to present at least one second control signal, as indicated by a block 236. Method 200 continues with operating the generating devices to provide no power, as indicated by a block 238.

Method 200 continues by posing a query whether the operating condition has changed, as indicated by a block 240. If the operating condition has not changed, method 200 proceeds via NO response and continues operating the generating devices to provide no power, as indicated by block 238. If the operating condition has changed, method 200 proceeds via YES response and returns to block 210 to continue.

If at the time of posing the query indicated by query block 230 the current indicator does not indicate a third operating condition, method 200 proceeds from query block 230 via NO response and returns to block 210 to continue.

As mentioned hereinbefore, one of the parameters in selecting the output capacitance bank for a converter such as may be embodied in phases $\Phi_1$, $\Phi_2$, $\Phi_3$, and $\Phi_n$ is the ripple current entering the capacitance bank from the power supply. The power supply 70 uses inductors to convert an input voltage to a new voltage on the output side of the converter. Under certain conditions, the ripple current can be reduced and the source can approximate a DC (Direct Current) source.

N-phase power supplies reduce ripple current because of the net effect of having n converters out of phase increases the output ripple frequency by a factor of n. This increase in ripple current frequency improves output ripple current. However, it is known that certain topologies (like the dual-interleaved forward) produce zero ripple current under specific situations. By way of example and not by way of limitation, a dual-interleaved forward topology operating at 50% duty cycle for each phase produces nearly zero ripple. By way of another example, the turns ratio of an output transformer for a power supply apparatus may be adjusted to present a zero-ripple current at a particular input voltage.

Another approach to making a zero ripple machine where the input voltage is fixed and the output voltage is regulated may be by staggering n-phases at some multiple of the inherent duty cycle (e.g., in the case of non-isolated buck converters). The duty cycle on a buck converter is proportional to the output voltage divided by the input voltage moderated by the voltage losses due to switches, diodes, and transformer leakages. In a non-isolated buck, there can be a particular number of phases that will produce a zero-ripple output. However, the particular number of phases is not driven by the current carrying capability of each phased current source rather than being driven by the zero ripple requirement.

Such solutions to presenting a zero-ripple output have proven satisfactory so long as one happens to need exactly the right number of phases and so long as the input voltage is totally tunable to obtain the desired resultant output. These are design restrictions not often accommodated by applications in which a power supply apparatus may be employed.

In the preferred embodiment of the present invention improved achievement of a zero-ripple output may be realized by replacing a single winding (2 pin) inductor with a more complex multi-tapped inductor (e.g., 3 or 4 pins) in order that the output ripple current can be reduced to near zero, or zero ripple current. Providing a multi-tapped inductor structure permits selecting a tap to establish an approximate desired turns ratio such that the inherent duty cycle produces zero ripple.

A design process for such an improved zero-ripple output apparatus may involve first determining the maximum current to be experienced per phase in the apparatus. The maximum current per phase is controlled by the thermal profile of the design. Given the trend of the marketplace toward ever smaller more compact products, design objectives for the apparatus are presumed to include small size. A small size encourages a higher switching frequency. A higher switching frequency creates more switching losses and leaves less room in the thermal profile for conduction losses. Once the maximum current per phase is determined, the maximum current divided by the current per phase yields the number of phases required.

This design process presumes that the input voltage is relatively constant. Voltage losses across the active elements may determined and the inherent duty cycle may be calculated $$\left(\frac{V_{OUT}}{V_{IN}}, \text{modified by the losses.}\right)$$

The turns ratio to make the duty cycle of the apparatus produce a zero-ripple output may now be determined. There are several solutions that can be implemented here. By way of example and not by way of limitation, five channels could be configured to operate at a 20% duty cycle each. Alternatively, five channels could be configured to operate at a 40% duty cycle each. Both solutions will yield a zero current converter. The 40% duty cycle solution will step from maximum output to minimum output, and will step from minimum output to maximum output quickly. The 20% duty cycle solution will step from minimum output to maximum output quickly, but will step from maximum output to minimum output more slowly. These considerations may be taken into account in selecting number of channels n and duty cycle characteristics to design an apparatus for requirements of a particular application.

The turns ratio must necessarily be a whole number and it is known to be better if the turns ratio is kept small. Keeping the number of turns small is consistent with the design goal of making the apparatus small. However, the integer turn ratio may not align precisely with a desired turns ratio for producing a zero-ripple output. Such a between a desired turns ratio and an actual turns ratio may yield a discontinuity in the zero ripple output. The inventor has observed that overlapping the duty cycle among phases $\Phi_1$, $\Phi_2$, $\Phi_3$, and $\Phi_n$ can improve performance when accepting a lesser turns ratio than the desired turns ratio. Additionally, it may be possible in particular application to increase or decrease the input voltage to achieve a zero ripple output. These considerations are substantially equally valid to buck, boost, and flyback topologies.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

I claim:

1. A DC-DC converter having a plurality of operating conditions for providing power to a load, the DC-DC converter comprising:
   a plurality of generating devices, wherein each generating devices is adapted to provide power to the load;
   a plurality of switches, wherein each switch is coupled between the load and at least one of the generating devices;
   a sensing unit coupled to the load that senses current through the load, wherein a sensed current through the load indicates at least one of the operating conditions, and wherein the sensing unit further comprises a comparator that receives the sum of a plurality of signals from the load and receives the sum of a plurality of signals from the generating devices; and
   a control unit including:
      a signal generator that is coupled to the sensing unit and that outputs a plurality of phase control signals;
      a level setting unit that receives a feedback current from the load; and
      a plurality of logic gates that are coupled to signal generator and the level setting unit, wherein the logic gates actuate two or more switches so that two or more generating devices substantially simultaneously provide the power to the load for at least one of the operating conditions.

2. The DC-DC converter as recited in claim 1 wherein at least one of the operating conditions is extant when an indicator indicates current through the load is greater than a predetermined first current level.

3. The DC-Dc converter as recited in claim 2 wherein the indicator is the current though the load.

4. The DC-DC converter as recited in claim 3 wherein the second operating condition is extant when the current through the load is greater than a predetermined first current level.

5. A DC-DC converter having a plurality of operating conditions for providing power to a load, the apparatus comprising:
   a plurality of generating units that are coupled in parallel to one another, wherein each generating unit includes:
      a current source; and
      a switch that is coupled to the current source, wherein the switch enables the current source to provide power to the load when actuated;
   a sensing unit that is coupled to each generating unit and coupled to the load, wherein the sensing unit senses the current through the load to indicate at least one of the operating conditions, and wherein the sensing unit includes a comparator that receives the sum of a plurality of signals from the load and receives the sum of a plurality of signals from the generating units; and
   a control unit including:
      a signal generator that is coupled to the sensing unit and that outputs a plurality of phase control signals;
      a level setting unit that receives a feedback current from the load; and
      a plurality of logic gates that are coupled to signal generator and the level setting unit, wherein the logic gates actuate or deactuate two or more switches substantially simultaneously in response to at least one of the operating conditions.

6. The DC-DC converter of claim 5, wherein the plurality of operating conditions further comprises an operating condition where all of the switches are actuated.

7. The DC-DC converter of claim 5 wherein the plurality of operating conditions further comprises an operating condition where none of the switches are actuated.

* * * * *